United States Patent [19]

Modly

[11] Patent Number: 4,624,710

[45] Date of Patent: Nov. 25, 1986

[54] PIGMENT CONSISTING OF A MIXTURE OF CHROMIUM OXIDE AND IRON OXIDE USEFUL IN HIGH INFRA RED REFLECTANCE GRAY VINYL COMPOSITION

[75] Inventor: Zoltan M. Modly, Shaker Heights, Ohio

[73] Assignee: Harshaw/Filtrol Partnership, Cleveland, Ohio

[21] Appl. No.: 781,613

[22] Filed: Sep. 30, 1985

[51] Int. Cl.$^4$ .................. C08K 3/20; C08K 3/10; C04B 14/34; C09C 1/62

[52] U.S. Cl. .................. 106/290; 106/286.2; 106/286.3; 106/302; 524/407; 524/567

[58] Field of Search .................. 106/302, 286.2, 286.3, 106/290

[56] References Cited

U.S. PATENT DOCUMENTS

| | | | |
|---|---|---|---|
| 3,528,839 | 9/1970 | Weber | 106/302 |
| 3,561,989 | 2/1971 | Weber | 106/302 |
| 4,205,996 | 6/1980 | Eppler | 106/302 |
| 4,424,292 | 1/1984 | Ravinovitch et al. | 524/180 |
| 4,457,784 | 7/1984 | Bernhard | 106/302 |

FOREIGN PATENT DOCUMENTS

| | | | |
|---|---|---|---|
| 488838 | 1/1976 | U.S.S.R. | 106/302 |
| 456529 | 9/1977 | U.S.S.R. | 106/302 |

Primary Examiner—Herbert J. Lilling

[57] ABSTRACT

This invention relates to a gray vinyl polymer material having improved tolerance to sunlight and other sources of infra red radiation. The vinyl polymer contains an inorganic pigment composed of chromium oxide ($Cr_2O_3$) and iron oxide ($Fe_2O_3$) wherein the weight ratio of the oxides is about 3:1. The pigment may be blended with titanium dioxide ($TiO_2$) to give a continuous spectrum of shades ranging from dark gray to light gray. The pigment is prepared by co-calcining the oxides of chromium and iron in finely divided form ($-325$ mesh) at a relatively low (900°–950° C.) temperature followed by grinding of the co-calcined product to 99% $-325$ mesh.

2 Claims, No Drawings

PIGMENT CONSISTING OF A MIXTURE OF CHROMIUM OXIDE AND IRON OXIDE USEFUL IN HIGH INFRA RED REFLECTANCE GRAY VINYL COMPOSITION

BACKGROUND OF THE INVENTION

In recent years there has been a steady growth in the use of polymeric compositions as a substitute for wood and other materials of construction in building applications. Of particular significance has been the increased use of rigid polyvinyl chloride in place of wood for house sidings. This polymeric material has many decorative and structural attributes that are desired by many home owners. It can be blended with a wide variety of inorganic pigments to give an infinite number of colors and hues. Many of these pigments, such as the Meteor ® colors produced by Harshaw/Filtrol Partnership are compatible with polyvinyl chloride and are especially formulated to be resistant to fading in sunlight.

Polyvinyl chloride compositions are blended with various additives to increase their tolerance to sunshine, particularly the rays in the infra red (700 to 1000 nm) range. Without these additives, a polymeric composition readily oxidizes and degrades, becoming brittle and cracking in a very short time. Also, when used as siding, the polymer tends to buckle and become unsightly in appearance.

One important characteristic of the pigments and other additives that are blended with the vinyl is their ability to reflect infra red rays. A highly reflective siding will remain cooler when exposed to sunlight than a siding containing additives which readily absorb many of these IR rays. Lower temperatures mean lower heat buildup within the structure and longer life for the siding. With the desire of customers to have extremely stable, maintenance free siding, manufacturers have been compelled to warrant the life of siding materials for 20 or 30 years. With this prolonged exposure, a reduction of a few degrees in heat build-up translates into a substantial increase in the life of the siding.

DISCUSSION OF PRIOR ART

There are numerous patents covering dark pigment compositions containing iron and chromium. For example, U.S. Pat. No. 2,187,822 (I. G. Farben) relates to a process of producing a brown pigment having the formula $3K_2O.11Fe_2O_3.16CrO_3.12H_2O$. In this pigment, the weight ratio of the oxides of chromium and iron is approximately 1:1.

U.S. Pat. No. 3,561,989 (Bayer) relates to a black enamel having a corundum structure in the form of $Fe_2O_3$ and containing 66 to 95 parts by weight of $Cr_2O_3$ per 100 parts of $Fe_2O_3$. No mention is made of its possible use in vinyl or other polymers for house siding. Instead its suggested uses are limited to enameling and glazing.

U.S. Pat. No. 3,528,839 (Bayer) covers a black pigment containing copper, iron, and chromium in a spinel structure and having higher temperature stability, high tinting strength, good light fastness and resistance to weathering. The atomic weight ratio of copper to chrome and iron is 0.25–0.5 and the ratio of iron to chrome is 0.25–0.5.

Various means have been used in the past to protect polyvinyl chloride against the deleterious action of sunlight and infra red rays. Typically, the use of antioxidants and anti-ozonants, blended into the PVC monomer have proved to be helpful. Other means such as that covered by German Offenlegungsschrift No. 2,719,170 (Dynamit Nobel AG) are also useful. This patent publication describes protecting the PVC extrusion with a methacrylate coating containing light stabilizers which block the ultraviolet but which permit the infra-red rays to enter the PVC and to be reflected by the pigments in the PVC.

Yet another approach is that covered by U.S. Pat. No. 4,424,292 (B. F. Goodrich Company). This patent relates to a vinyl polymer composition having reduced heat buildup without sacrificing UV protection. The method includes the use of a chromium oxide/iron oxide black pigment having good IR reflecting properties. Details of the pigment are not given, although a specific reference is made to a Ferro pigment No. 0-1316 Black.

BRIEF DESCRIPTION OF THE INVENTION

The present invention represents a specific improvement over the teachings of the prior art, specifically this Goodrich patent. The invention has as its object an improved vinyl composition having resistance to sunlight and weathering that is better than that achievable with pigments compositions available only a few short years ago. Another object is a novel inorganic pigment useful in vinyl siding which results in reduced heat buildup, said pigment having properties, and prepared according to conditions, which result in a highly optimized set of conditions for high infra red reflectance when incorporated into vinyl compositions. The weight ratio of chromium to iron in the pigment is between about 2.5 and about 3.5 to 1, preferably about 3 to 1. The pigment is brown in masstone but when blended with $TiO_2$ gives shades of gray, varying from extremely dark gray where very small amounts of $TiO_2$ are used, to very light gray when substantially greater amounts of $TiO_2$ are present. The pigment comprises a mixture of the oxides of chromium and iron calcined at a temperature in the range of 900°–950° C. The co-calcined mixture of oxides is ground to a small particle size of at least 98% and preferably 99%—325 mesh.

DETAILED DESCRIPTION OF THE INVENTION

The present invention will be described primarily with reference to polyvinyl chloride (PVC) with the understanding that it likewise applies to other vinyl homo-polymers and co-polymers such as those described in the aforementioned Goodrich patent U.S. Pat. No. 4,424,292. The PVC material typically contains other additives well known to those skilled in the art of compounding such polymers, all designed to enhance the properties of the polymer when used as a rigid structural material for siding and other decorative applications.

The pigment useful in the present invention contains between 40 and 60% by weight of chromium, present in oxide form and between 25 and 12% by weight of iron, also present as the oxide. A more preferred range is between 48 and 52% chromium and between 19 and 16% iron. In a highly preferred embodiment of the invention, the chromium is present as 49.8% and the iron as 17.6%. This represents 73.91% as $Cr_2O_3$ and 26.09% as $Fe_2O_3$.

The pigment is prepared by weighing out the chromium oxide such as G-4099 sold by Pfizer, and a very fine particle size iron oxide such as Mapico Brown 444, sold by Columbian Carbon. This iron oxide has the general formula $FeO.Fe_2O_3$, an average particle size of $0.50\mu$ and a cubical particle shape. Less than 0.005% of the iron oxide is retained on a 200 mesh screen. The oxides are thoroughly blended together and are pulverized in a ball mill, hammer mill or other particle size reducer. The blend is then calcined for a period of time ranging from 2 to 5 hours at 900°–950° C. in an elevator kiln, rotary calciner, or other suitable calcining apparatus. After calcining, the blend is again pulverized so that at least 98% and preferably 99% passes a −325 mesh screen. The final product has an X-ray diffraction pattern that can be identified as $Cr_2O_3$ (Eskolaite) as the major crystalline component.

This pigment typically is blended with a fine particle size $TiO_2$ and the blend is incorporated into a vinyl material such as Geon marketed by B. F. Goodrich Chemical Company. The blend is then extruded into architectural shapes such as rigid siding having a gray color. The shade of the gray color is directly dependent upon the percent of $TiO_2$ in the pigment blend, higher amounts of $TiO_2$ giving lighter shades. Other pigments may be added in small amounts to adjust and color match the shades to specific end use applications.

A better understanding of the present invention can be obtained by reference to the following examples:

EXAMPLE I

A pigment comprising 48.8 weight percent chromium present as $Cr_2O_3$ and 17.6 weight percent iron present as $Fe_2O_3$ was prepared by blending together Mapico Brown 444 (Columbian Carbon) iron oxide pigment and G-4099 chromium oxide (Pfizer) and pulverizing the blend in a hammer mill to 99% −325 mesh. The blend was calcined in an elevator kiln at 900°–950° C. for three hours following a two hour heat-up. The calcined blend was again hammer milled to 99%−325 mesh.

Rigid vinyl test panels were prepared to measure the infra red reflectance and heat buildup comparing this pigment with other commercially available pigments including bone black, carbon black, copper chromium, V-700 iron chromium black marketed by Ferro Corporation and BK-250 iron oxide black marketed by Pfizer. Each of these pigments was blended with 12 parts of R960 $TiO_2$ marketed by E. I. duPont and the color shades were all matched with the addition of minor amounts of buff and brown to obtain nearly identical Hunter color values. The actual formulation of the blends is listed below:

|  | Loading (parts per 100 parts of vinyl resin) |
|---|---|
| Blend A |  |
| Carbon Black | .051 |
| Yellow Buff | .206 |
| Brown | .079 |
| TiO2 | 12.000 |
|  | 12.336 |
| Blend B |  |
| Bone Black | 1.317 |
| Yellow Buff | .239 |
| Brown | .079 |
| TiO2 | 12.000 |
|  | 13.635 |
| Blend C |  |
| Copper Chromium | .636 |
| Yellow Buff | .318 |
| Brown | .526 |
| TiO2 | 12.000 |
|  | 13.480 |
| Blend D |  |
| Iron Oxide Black (Pfizer) | .382 |
| Yellow Buff | .318 |
| Brown | .263 |
| TiO2 | 12.000 |
|  | 12.963 |
| Blend E |  |
| High IR Black by Ferro | 1.486 |
| Yellow Buff | .268 |
| TiO2 | 12.000 |
|  | 13.754 |
| Blend F |  |
| High IR Black (Present Invention) | 1.111 |
| Yellow Buff | .205 |
| TiO2 | 12.000 |
|  | 13.316 |

Each blend was mixed with 100 parts of Geon 85862 Natural 001 resin, a clear vinyl polymer marketed by B. F. Goodrich. Mixing was done on a 2 roll mill after which the resin was sheeted out to a thickness of 40 mils. A test panel measuring 3″×9″ was cut from each sheet and was exposed to infra red radiation in an industrial infra red reflector using a 250 watt source. The reflector is available from General Electric. Each test panel was positioned 15.7″ from the infra red reflector. A power stat was used to adjust the line voltage which controlled the reflector radiation intensity to maintain a black painted aluminum panel body temperature of 170° F. and a white painted aluminum panel body temperature of 126° F. A thermocouple in contact with the back surface of each panel monitored the body temperature until the temperature was stabilized for at least 5 minutes. The average test time per panel was 35 minutes.

The results of the average infra red reflectance over the range of 700 to 1000 nm as well as the body temperature measured in °F. are tabulated in Table I as follows:

TABLE I

| Panel | IR Reflectance | Body Temperature (°F.) |
|---|---|---|
| A | 42.1 | 155 |
| B | 41.0 | 157 |
| C | 43.2 | 152 |
| D | 43.7 | 162 |
| E | 69.2 | 134 |
| F | 68.5 | 130 |

The two vinyl panels E & F containing the iron oxide/chromium oxide pigments showed a substantially higher reflectance values and lower heat buildup than the panels containing the other pigments. Furthermore, it should be noted that in the present invention, 1.111 parts of the black pigment were used per 100 parts of resin to obtain the same color intensity as that obtained by 1.486 parts of the Ferro IR black. Thus, unexpectedly, the tinting strength of the present invention is approximately 25 to 30% greater than that of the best commercially available prior art compound. This of course results in a substantial reduction in the amount of pigment that is required, thereby affecting a substantial savings in cost.

EXAMPLE II

To show the effect of particle size on reflectance, a pigment consisting of a blend of Ferro V-700 (the $CR_2O_3/Fe_2O_3$ material from Ferro) and $TiO_2$ in a 1:1 ratio was dispersed in an alkyd vehicle and was applied to a standard draw-down chart. The ratio of the chromium oxide to iron oxide in the V-700 was 89.4 to 10.6. This was compared to a pigment of the present invention, adjusted to have the same ratio of oxides as that of the Ferro material. The infra red value obtained in the industrial infra red reflector was 42.9 for the V-700 and 46.5 for the finer particle size pigment of the present invention, thereby showing a substantial increase in the reflectivity of the pigment of the present invention.

EXAMPLE III

A series of tests was run on pigment samples prepared by the present invention (i.e., calcine at 900°-950° C. and grind to 99% −325 mesh). The chromium to iron oxide ratio was varied from 85/15 to 70/30. The pigments again were dispersed in an alkyd vehicle and were applied to a draw-down chart. The light intensity and IR reflectance of each draw-down was measured on a match scan spectrophotometer with specular component included, using a D-6500 illluminant and Hunter Color Space Coordinates. The results are shown in Table II as follows:

TABLE II

| Chart | Ratio $Cr_2O_3/Fe_2O_3$ | IR | L |
| --- | --- | --- | --- |
| G | 85/15 | 43.77 | 43.53 |
| H | 82/18 | 41.39 | 42.74 |
| J | 74/26 | 37.77 | 41.55 |
| K | 70/30 | 36.43 | 40.95 |

It is noted that as the ratio of chromium oxide to iron oxide is reduced, the infra red reflectance decreases from 43.77 to 36.43. However, significantly, the lower L value means that less pigment is required to achieve a desired level of tinting strength. By using less pigment, there is a reduction in heat buildup in a rigid panel.

EXAMPLE IV

The effect of calcining temperature on the high infra red pigment of the present invention was demonstrated in the following test in which 3 samples of the pigment containing 49.5% by weight chromium and 17.9% iron were calcined for 3 hours at 1000° C., 975° C. and 950° C. respectively. They were then tested in the same manner as in the previous example with the results are shown in Table III as follows:

TABLE III

| Chart | Calcining Temp. (°F.) - 3 hrs. | IR | L |
| --- | --- | --- | --- |
| L | 1000° | 37.77 | 41.55 |
| M | 975° | 38.30 | 41.26 |
| N | 950° | 40.38 | 41.10 |

The relative tinting strength of the samples were nearly identical as can be seen from Table III while the reflectance values increased from 37.77 for the pigment calcined at 1000° C. to 38.30 for the pigment calcined at 975° and a high of 40.38 for the pigment calcined at 950°. Thus it is to be noted that the reduction in calcining temperature results in a substantial improvement in the reflectance of the calcined pigment.

The improvements over the prior art have been clearly demonstrated by the foregoing examples. The chromium/iron pigment when prepared and used according to the teachings of the instant invention has higher tinting strength and when used in a rigid vinyl polymer results in a decorative building material that remains cooler, thereby helping to avoid many of the degradation problems of the prior art building materials.

I claim:

1. An inorganic pigment having high reflectance in the infra red range when blended into a polyvinyl chloride resin, said pigment prepared by cocalcining a mixture consisting essentially of the oxides of chromium and iron in a weight ratio of approximately 2.5 to 3.5 parts of chromium to 1 part of iron, said mixture having a particle size whereby at least 99% passes a 325 mesh screen.

2. The pigment according to claim 1 wherein the ratio of chromium to iron is approximately 3:1.

* * * * *